United States Patent [19]

Ugawa

[11] Patent Number: 5,042,200
[45] Date of Patent: Aug. 27, 1991

[54] DOOR GLASS RUN STRUCTURE FOR AUTOMOBILE

[75] Inventor: Satoru Ugawa, Hadano, Japan

[73] Assignee: Nissan Motor Co., Ltd., Yokohama, Japan

[21] Appl. No.: 637,964

[22] Filed: Jan. 9, 1991

Related U.S. Application Data

[63] Continuation of Ser. No. 219,507, Jul. 15, 1988, abandoned.

[30] Foreign Application Priority Data

Jul. 15, 1987 [JP] Japan .............................. 62-108654[U]

[51] Int. Cl.$^5$ ................................................ E06B 7/16
[52] U.S. Cl. .......................................... 49/488; 49/374
[58] Field of Search .................. 49/374, 440, 441, 488, 49/489, 490, 497, 498, 378, 485, 480, 481, 484; 296/146, 201

[56] References Cited

U.S. PATENT DOCUMENTS

| 2,737,412 | 3/1956 | Smith et al. | 49/498 |
| 3,600,858 | 8/1971 | Savell | 49/488 |
| 4,608,779 | 9/1986 | Maeda et al. | 49/374 |
| 4,649,669 | 3/1987 | Okamoto et al. | 49/489 |
| 4,756,944 | 7/1988 | Kisanuki | 49/490 |
| 4,919,471 | 4/1990 | Seino et al. | 49/488 |

FOREIGN PATENT DOCUMENTS

| 3500791 | 7/1985 | Fed. Rep. of Germany | 49/348 |
| 60-165213 | 11/1985 | Japan | 49/490 |

Primary Examiner—Kenneth J. Dorner
Assistant Examiner—Gerald A. Anderson
Attorney, Agent, or Firm—Foley & Lardner

[57] ABSTRACT

A glass run structure for a door of an automobile including a door frame and a door glass adapted to be movable up and down in contact with a glass run member mounted to the door frame, the glass run member including a projected lip for making resilient contact with the door glass, and a guide surface for limiting the projected lip bent towards the inside of the automobile, in which the guide surface is so formed skew with respect to the door glass that its upper end is positioned nearer to the door glass than its lower end, thereby always realizing a substantially flat surface connection of the door glass with a side body of the automobile when the door is closed.

3 Claims, 2 Drawing Sheets

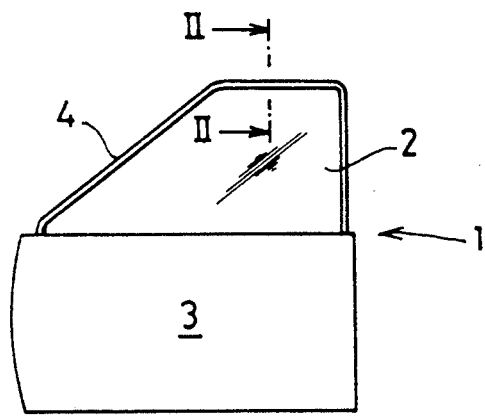
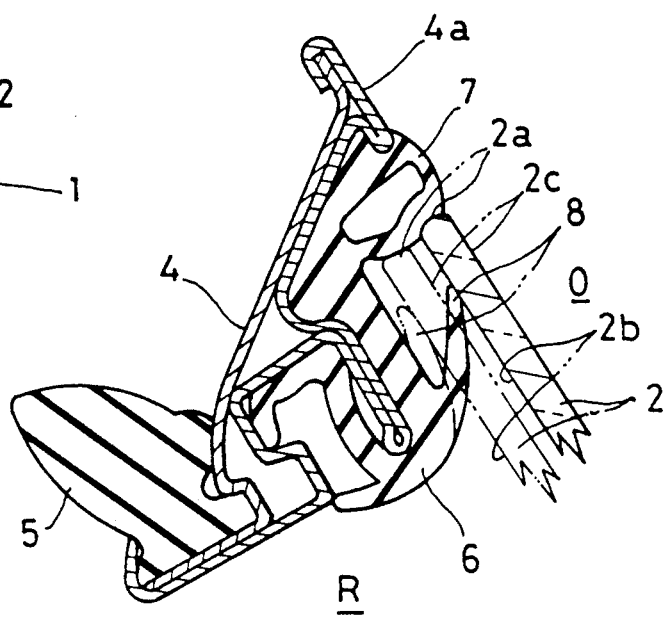
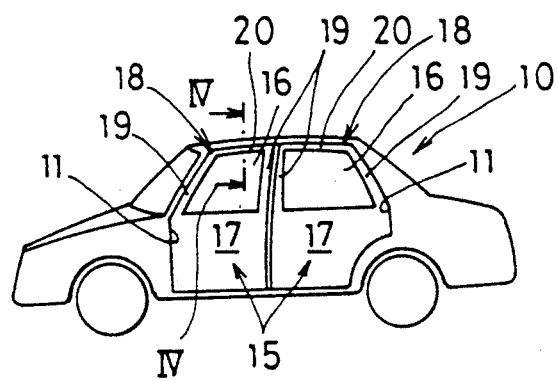
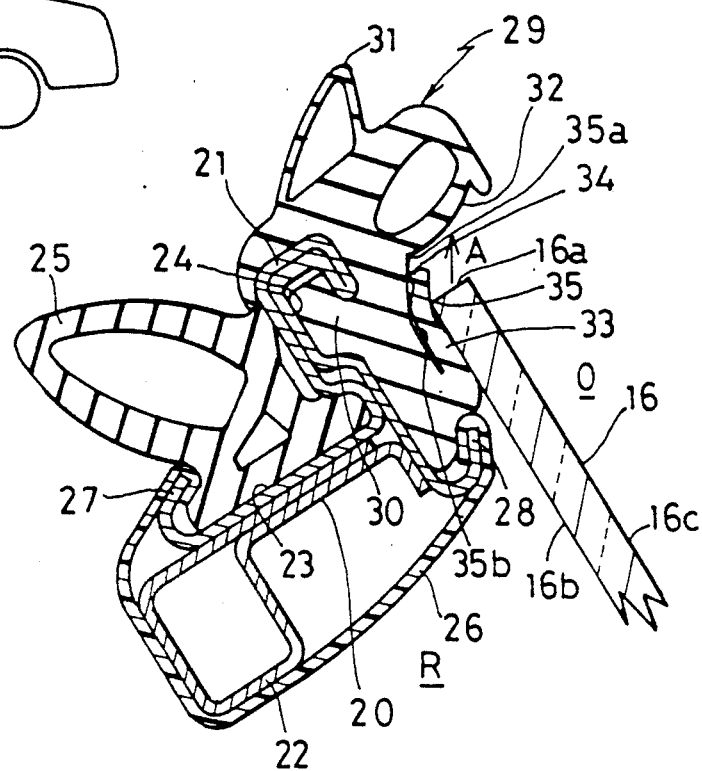

DOOR GLASS RUN STRUCTURE FOR AUTOMOBILE

This application is a continuation of application Ser. No. 219,507, filed July 15, 1988, now abandoned.

BACKGROUND OF THE INVENTION

1. Field of the Invention

The present invention relates to a glass run structure for a door of an automobile, which is capable of realizing a so-called flush surface connection, i.e., an approximately flat surface connection of an outer surface of a door glass with an outer surface of a side body in its door open-close portion when the door is closed.

2. Description of the Prior Art

A conventional glass run member for a door of an automobile, designed for intending a flush surface connection, that is, an approximately flat surface connection of an outer surface of a door glass with an outer surface of a side body in its door open-close portion on closing the door, has been proposed, as disclosed in the Japanese Utility Model Laid-Open Specification No. 60-155630. In this embodiment, as shown in FIG. 1, the door 1 comprises a door glass 2 adapted to be movable up and down, a door body 3 having a housing therein for the movable door glass 2, and a door frame 4 mounted to the door body 3, the door frame 4 defining an upper outline of the door 1.

FIG. 2 shows a longitudinal section of an upper part of the door 1. A weather strip 5 to make tight contact with a door opening end portion of the side body of the automobile is mounted to the upper surface of the door frame 4 on an internal side R of the automobile, and the glass run member 6 is disposed at the lower surface of the door frame 4 on an external side O of the automobile. The weather strip 5 and the glass run member 6 are made of a resilient material such as rubber or a synthetic resin.

The glass run member 6 is provided with a hollow lip 7 to resiliently make contact with an upper end 2a of the door glass 2 and with a projected lip 8 having a tongue-like shape to resiliently contact an inner surface 2b of the door glass 2. An outer surface 2c of the door glass 2 is arranged in substantially the same flat plane as that where an outer surface 4a of the door frame 4 and the outer surface of the door open-close portion of the side body (not shown) of the automobile are positioned when the door 1 is closed. Therefore, the outer surface 2c of the door glass 2 is approximately linked to the outer surface 4a of the door frame 4 and the outer surface of the side body via the hollow lip 7 of the glass run member 6 in substantially the same flat plane.

In this conventional door 1, when the door glass 2 is properly mounted to the door body 3, as shown by the solid lines in FIG. 2, the outer surface 2c of the door glass 2 and the outer surface 4a of the door frame 4 are arranged in substantially the same flat plane, resulting in a flush surface connection of the outer surface 2c of the door glass 2 with the outer surface 4a of the door frame 4, as described above. However, when the door glass 2 is improperly mounted to the door body 3, for example, when it is inclined toward the internal side R due to an assembling error or the like, the projected lip 8 is deformed and becomes largely bent towards the internal side R by the inclined door glass 2, with the door glass 2 being fixed to the inclined position from the normal position, as shown by the two-dotted lines in FIG. 2. Consequently, the outer surface 2c of the door glass 2 becomes arranged in a discontinuous state with respect to the outer surface 4a of the door frame 4, thereby losing the flush surface connection thereof.

SUMMARY OF THE INVENTION

Accordingly, it is an object of the present invention to provided a door glass run structure for an automobile, free from the aforementioned disadvantages and defects of the prior art, which is capable of attaining a flush surface connection or an approximately flat surface connection of an outer surface of a door glass with an outer surface of a side body in its door open-close portion when the door is closed, even in the event of an assembly error.

In accordance with one aspect of the present invention, there is provided a glass run structure for a door of an automobile, comprising a glass run member, mounted to a door frame, including a projected lip for resiliently contacting a door glass adapted to be movable up and down in contact with the glass run member, and a guide surface for limiting the projected lip bent towards the inside of the automobile, the guide surface being formed skew with respect to the door glass so that its upper end is positioned nearer to the door glass than its lower end.

In accordance with another aspect of the invention, there is provided a glass run structure for a door of an automobile, comprising a door frame, a glass run member mounted to the door frame, and a door glass adapted to be movable up and down in contact with the glass run member, the glass run member including a projected lip for resiliently contacting an inner surface of the door glass, and a guide surface for limiting the projected lip bent by the door glass towards the inside of the automobile. The guide surface being formed on a slant with respect to the door glass, and an upper end of the guide surface is positioned nearer to the door glass than a lower end of the same, thereby realizing an approximately flat surface connection of an outer surface of the door glass with an outer surface of a side body of the automobile when the door is closed.

BRIEF DESCRIPTION OF THE DRAWINGS

FIG. 1 is a front view of a conventional door;

FIG. 2 is a longitudinal cross sectional view, taken along the line II—II of FIG. 1;

FIG. 3 is a side view of an automobile including a door glass run structure according to the present invention;

FIG. 5 is a longitudinal cross sectional view, like FIG. 4, showing the upward moving door glass of FIG. 4.

DESCRIPTION OF THE PREFERRED EMBODIMENT

Figure 4:
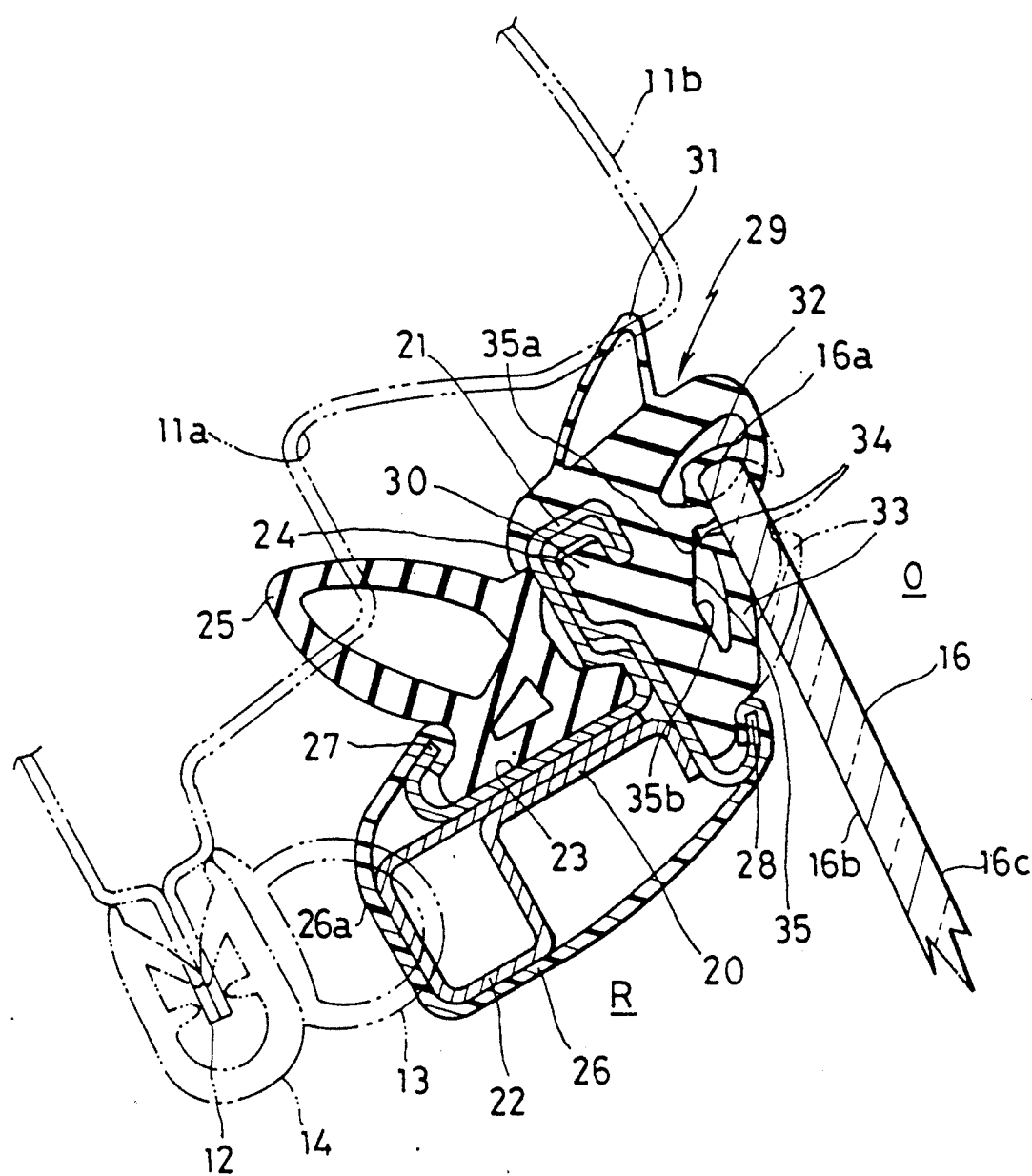
FIG. 4 is a longitudinal cross sectional view, taken along the line IV—IV of FIG. 3.

Referring now to the drawings, wherein like reference characters denote like or corresponding parts, there is shown in FIGS. 3 to 5 one embodiment of a door glass run structure for an automobile according to the present invention.

In FIG. 3, a body 10 of the automobile includes door openings 11 and doors 15 pivotally mounted on door opening portions in order to open or close the doors 15 in the door openings 11 in its side bodies, and each door opening 11 includes a peripheral wall 11a and an outer surface 11b, as shown in FIG. 4. A welt 14 having a welt seal 13 attached thereon is mounted to a flange portion 12 positioned in the lower end portion of the peripheral wall 11a in an internal side R of the automobile. Each door 15 comprises a door glass 16 adapted to be movable up and down, a door body 17 having a housing therein for the movable door glass 16, and a door frame 18 mounted to the top end of the door body 17, the door frame 18 conforming an upper outline of the door 15. The door frame 18 comprises two vertical frame members 19 extending upwards from the front and rear upper end portions of the door body 17 along the door glass 16, and one horizontal frame member 20 whose ends are integrally connected to the upper ends of the vertical frame members 19. The horizontal frame member 20 limits the end of the upward movement of the door glass 16. The vertical frame members 19 and the horizontal frame member 20 have the same construction or the same shape in their sections.

Each of the vertical and horizontal frame members 19 and 20 comprises an outer panel 21 and an inner panel 22 which are joined by spot welding. The outer panel 21 is provided with a first engaging portion 23 having a channel form opposite to the peripheral wall 11a of the door opening 11 and is also provided with a second engaging portion 24 having a channel form, opening towards an external side O of the automobile. A weather strip 25 is fitted in the first engaging portion 23 of the outer panel 21 in order to make tight contact with the peripheral wall 11a of the door opening 11 when the door 15 is closed, and a garnish 26, made of a synthetic resin material, for covering the inner panel 22 includes a contact surface 26a on its inner end portion, the contact surface 26a making contact with the welt seal 13 of the welt 14 when the door 15 is closed. Both ends of the garnish 26 are fitted on hook portions 27 and 28 of the first and second engaging portions 23 and 24 of the outer panel 21.

A glass run member 29 is provided with a base portion 30, a first hollow lip 31 to make tight contact with the peripheral wall 11a of the door opening 11, a second hollow lip 32 to make tight contact with an upper end 16a of the door glass 16 when the door glass is closed, and a projected lip 33 having a tongue-like shape to make tight contact with an inner surface 16b of the door glass 16, and is mounted to the outer panel 21 by fitting the base portion 30 in the second engaging portion 24. The door glass 16 is moved up and down in contact with the glass run member 29. The weather strip 25 and the glass run member 29 are usually made of a resilient material such as rubber or a synthetic resin, e.g., polyvinyl chloride. The projected lip 33 of the glass run member 29 normally projects towards the external side O, as shown by the two-dotted lines in FIG. 4, and is formed with a small bump 34 on its upper internal side end.

When the door glass 16 is closed, the projected lip 33 of the glass run member 29 is deformed to bend towards the internal side R while the projected lip 33 makes tight contact with the inner surface 16b of the door glass 16, whereby the door glass 16 is so supported that the inner surface 16b of the door glass 16 may be substantially connected with the outer surface 11b of the door opening 11 of the side body in an approximately flat plane. The glass run member 29 is also provided with a guide surface 35 near the inner surface 16b of the door glass 16, and the bump 34 of the projected lip 33 being deformed when the door glass 16 is closed, as described above, approaches the guide surface 35. The guide surface 35 having an approximately flat surface is formed on a slant with respect to the door glass 16; i.e., an upper end portion 35a of the guide surface 35 is nearer to the door glass 16 than a lower end portion 35b of the guide surface 35.

In this embodiment, when the door glass 16 is improperly mounted to the door body 17 with an inclination toward the internal side R due to an assembling error or the like, as shown in FIG. 5, a larger load is given to the projected lip 33 from the door glass 16 as compared with a load given by the door glass properly mounted in the normal position, as shown in FIG. 4. As a result, the projected lip 33 will be inclined largely toward the internal side R. However, the bump 34 of the projected lip 33 contacts the guide surface 35 formed in proximity to the bump 34 of the projected lip 33, and the sloped guide surface 35 limits any further inclination of the projected lip 33. That is, as the opened door glass 16 is moved up in contact with the projected lip 33 of the glass run member 29, the guide surface 35 gradually pushes back the the inclined door glass 16 towards its normal position via the projected lip 33, as indicated by the arrow A of FIG. 5.

Therefore, as the improperly mounted door glass 16 is moved up in order to close the same, as shown in FIG. 5, the upper end 16a of the door glass 16 pushes the projected lip 33 and deforms the projected lip 33 making tight contact with the guide surface 35, and thus the upper end 16a of the door glass 16 moves along the slant guide surface 35 in tight contact therewith via the projected lip 33, as shown by the arrow A of FIG. 5. Then, when the door glass 16 is moved up to its upper end position, i.e., the closing position, the door glass 16 is led to the normal position, as shown in FIG. 4. Accordingly, in addition to when the door glass 16 is properly mounted to the door body 17 in the normal position, even when the door glass 16 is improperly mounted with the inclination towards the internal side R due to an assembling error or the like, the door glass 16 can be smoothly moved up along the slant guide surface 35 to the uppermost moving end of the normal position, and the outer surface 16b of the door glass 16 is substantially linked to the outer surface 11b of the door opening 11 in an approximately flat plane when the door is closed, resulting in a flush surface connection of the outer surface 16b of the door glass 16 and the outer surface of the side body of the automobile in its door open-close portion. Further, in this case, since the base portion 30 of the glass run member 29 is thickened by the forming of the slant guide surface 35 near the door glass 16, the supporting capacity of the glass run member 29 against the door glass 16 can also be improved.

What is claimed is:

1. A glass run structure for sealing a reciprocating door glass in a door opening having an outer surface, said glass run structure comprising:
   a resilient hollow lip structure having means for contacting an upper end of the door glass when the door glass is raised to a closed position;
   a resilient projected lip structure having means for contacting an inner surface of the door glass; and
   a guide surface having a portion formed at an angle with respect to the inner surface of the door glass such that an upper end of the guide surface is normally positioned nearer to the door glass than a lower end of the guide surface, the resilient projected lip structure the guide surface having means for engaging so as to guide the door glass as the door glass is raised to the closed position, wherein said angled portion of said guide surface limits movement of the projected lip structure deformed by the door glass when the door glass is raised to force the door glass outwardly into a position of proper contact with the hollow lip structure in which the outer surface of said door glass is approximately co-planar with said outer surface of said door opening.

2. The glass run structure as claimed in claim 1, wherein said projected lip structure includes a bump on an internal upper end thereof that contacts said angled portion of said guide surface to limit movement of the projected lip.

3. The glass run structure as claimed in claim 1, wherein said angled portion of said guide surface is formed approximately flat.

* * * * *